(12) United States Patent
Rapp et al.

(10) Patent No.: US 11,975,693 B2
(45) Date of Patent: May 7, 2024

(54) WIPER FRAME, IN PARTICULAR FOR A MOTOR VEHICLE

(71) Applicant: Robert Bosch GmbH, Stuttgart (DE)

(72) Inventors: Harald Rapp, Buehl (DE); Sascha Geissler, Lichtenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/771,207

(22) PCT Filed: Sep. 24, 2020

(86) PCT No.: PCT/EP2020/076730
§ 371 (c)(1),
(2) Date: Apr. 22, 2022

(87) PCT Pub. No.: WO2021/078467
PCT Pub. Date: Apr. 29, 2021

(65) Prior Publication Data
US 2022/0363223 A1 Nov. 17, 2022

(30) Foreign Application Priority Data
Oct. 25, 2019 (DE) ..................... 10 2019 216 431.5

(51) Int. Cl.
*B60S 1/38* (2006.01)
*B60S 1/52* (2006.01)

(52) U.S. Cl.
CPC ........... *B60S 1/3805* (2013.01); *B60S 1/3862* (2013.01); *B60S 1/524* (2013.01)

(58) Field of Classification Search
CPC ....... B60S 1/524; B60S 1/3803; B60S 1/3805
See application file for complete search history.

(56) References Cited

U.S. PATENT DOCUMENTS

| 3,936,901 A | 2/1976 | Theckston |
| 4,497,083 A | 2/1985 | Nielson, Jr. et al. |
| 5,426,814 A | 6/1995 | Minnick |
| 5,539,951 A | 7/1996 | Guell et al. |
| 2011/0185531 A1* | 8/2011 | Egner-Walter .......... B60S 1/381 15/250.01 |
| 2013/0193129 A1* | 8/2013 | Jones ..................... B60S 1/381 15/250.07 |
| 2015/0217730 A1* | 8/2015 | Boland ................. B60S 1/4048 15/250.04 |

(Continued)

FOREIGN PATENT DOCUMENTS

| CN | 109421674 A | 3/2019 |
| DE | 3545784 A1 | 9/1986 |

(Continued)

OTHER PUBLICATIONS

KR20110063539A (machine translation) (Year: 2011).*
Translation of International Search Report for Application No. PCT/EP2020/076730 dated Nov. 30, 2020 (3 pages).

*Primary Examiner* — Andrew A Horton
(74) *Attorney, Agent, or Firm* — Michael Best & Friedrich LLP

(57) ABSTRACT

The invention relates to a wiper frame (10), in particular for a motor vehicle, comprising a wiper blade (14), a liquid channel (30, 32) for carrying a cleaning liquid, and a heating unit (38). According to the invention, the heating unit (38) is substantially located inside the liquid channel (30, 32).

10 Claims, 3 Drawing Sheets

(56) References Cited

U.S. PATENT DOCUMENTS

| | | |
|---|---|---|
| 2015/0258966 A1 | 9/2015 | Thebault et al. |
| 2016/0229377 A1 | 8/2016 | Thebault et al. |

FOREIGN PATENT DOCUMENTS

| | | | | |
|---|---|---|---|---|
| DE | 4124360 A1 | 1/1993 | | |
| DE | 102004007351 A1 | 9/2005 | | |
| DE | 102008020227 A1 | 11/2009 | | |
| DE | 102009014313 A1 | 9/2010 | | |
| DE | 112011102657 T5 | 1/2014 | | |
| DE | 202016104003 U1 | 8/2016 | | |
| DE | 112014005838 T5 | 9/2016 | | |
| DE | 102018210758 A1 | 1/2020 | | |
| EP | 1418100 A | 5/2004 | | |
| GB | 2121681 A | 1/1984 | | |
| KR | 20110063539 A | * | 6/2011 | ............ B60S 1/3805 |
| WO | 2010034447 A1 | 4/2010 | | |
| WO | 2011038913 A1 | 4/2011 | | |
| WO | 2012089599 A1 | 7/2012 | | |
| WO | 2014019627 A1 | 2/2014 | | |

\* cited by examiner

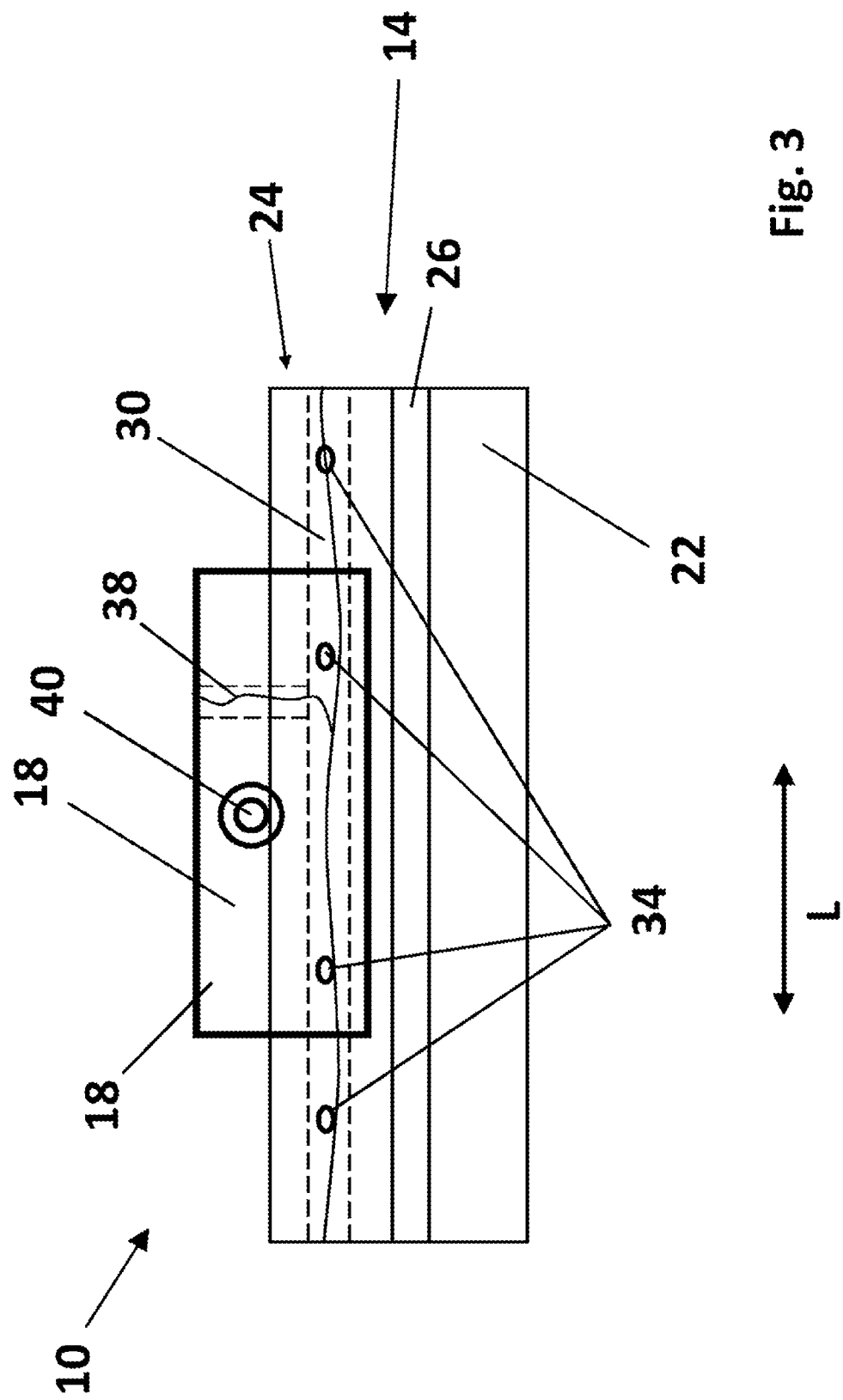

WIPER FRAME, IN PARTICULAR FOR A MOTOR VEHICLE

BACKGROUND OF THE INVENTION

The invention relates to a wiper blade, in particular for a motor vehicle.

Numerous wiper blades for motor vehicles are already known, which have a wiper strip, a liquid channel for guiding cleaning liquid, and a heating device. Wiper blades of this kind have a heating device which heats the spring rail of the wiper blade. This is complicated and expensive to manufacture.

SUMMARY OF THE INVENTION

The wiper blade according to the invention having the features of the main claim has the advantage that the heating device is arranged substantially within the liquid channel. This is simple and cost-effective to produce and, in addition, the heat of the heating device is applied directly where it is required.

The measures cited in dependent claims give rise to advantageous refinements and improvements of the features specified in the main claim.

It is particularly advantageous for the heating device to be in the form of a sheathed heating wire. Heating wires of this kind can be obtained in a cost-effective manner and can be inserted into the liquid channel in a simple manner.

Furthermore, it is advantageous for the heating wire to comprise a plastics sheath which, advantageously, is inexpensive and has the required service life.

Ideally, the liquid channel has at least one opening for dispensing cleaning liquid, thus making a simple and cost-effective configuration possible.

In this case, it is particularly advantageous for the openings to be arranged distributed over the longitudinal extent of the wiper blade, since this ensures that the cleaning liquid is dispensed uniformly along the longitudinal extent.

It is particularly simple and cost-effective to form the liquid channel in one piece with the wiper strip.

Ideally, the wiper strip has a wiper lip and is formed in one piece therewith. In this way, the wiper strip can be extruded or injection-molded directly with the wiper lip.

In a particularly effective and therefore advantageous configuration, the wiper blade has a fastening means for fastening to a wiper arm, and the heating device is guided through the fastening means. In this way, the fastening means can also be heated in a simple manner.

Ideally, a liquid channel also runs through the fastening means in this case.

Furthermore, it is advantageous for the liquid channel in the fastening means to have at least one opening for dispensing cleaning liquid, with the result that cleaning liquid can be dispensed directly out of the fastening means.

BRIEF DESCRIPTION OF THE DRAWINGS

Various exemplary embodiments of the invention are illustrated in the drawings and explained in more detail in the description below. In the drawings:

FIG. 3 shows a schematic side view of a central portion of the wiper blade.

DETAILED DESCRIPTION

Figure 1:
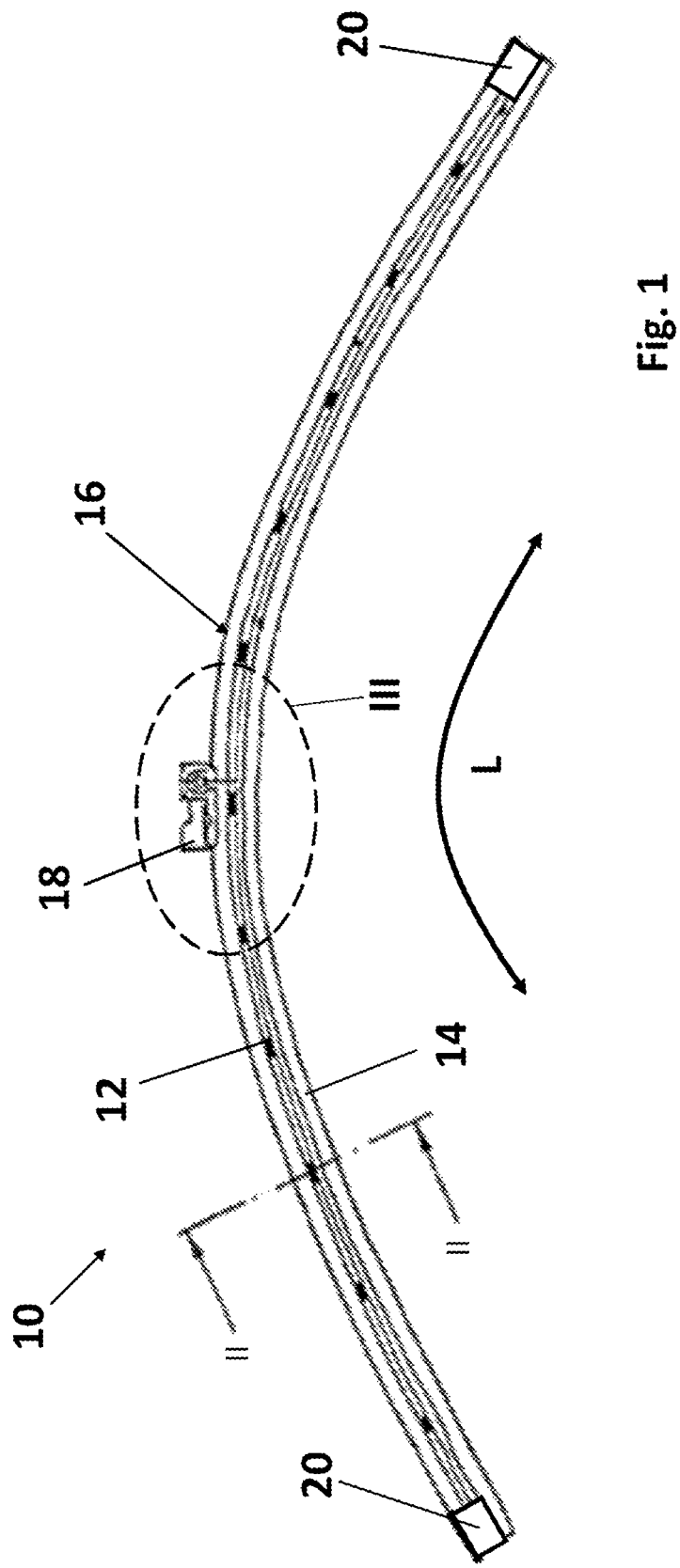
FIG. 1 shows a schematic side view of a wiper blade according to the invention.

FIG. 1 shows a schematic side view of a wiper blade 10 according to the invention. The wiper blade 10 according to the invention comprises a spring rail 12, which is formed from a strip steel and pre-bent in a convex manner. This produces a convex top side and a concave bottom side. Fastened to the spring rail 12, specifically to the concave bottom side of the spring rail 12, is a wiper strip 14 which, in a mounted position, rests on a window of the motor vehicle.

A wind deflecting strip 16 is fastened to that side of the spring rail 12 which faces away from the wiper strip 14, that is to say to the convex top side. The wiper blade 10 has a longitudinal extent (double arrow L), a fastening means 18 being arranged approximately in the center of the longitudinal extent and being used to fasten the wiper blade 10 to a wiper arm which is not depicted here for reasons of clarity. End caps 20 are in each case provided at the ends of the longitudinal extent (double arrow L), said end caps closing off the wiper blade 10 along its longitudinal extent (double arrow L).

Figure 2:
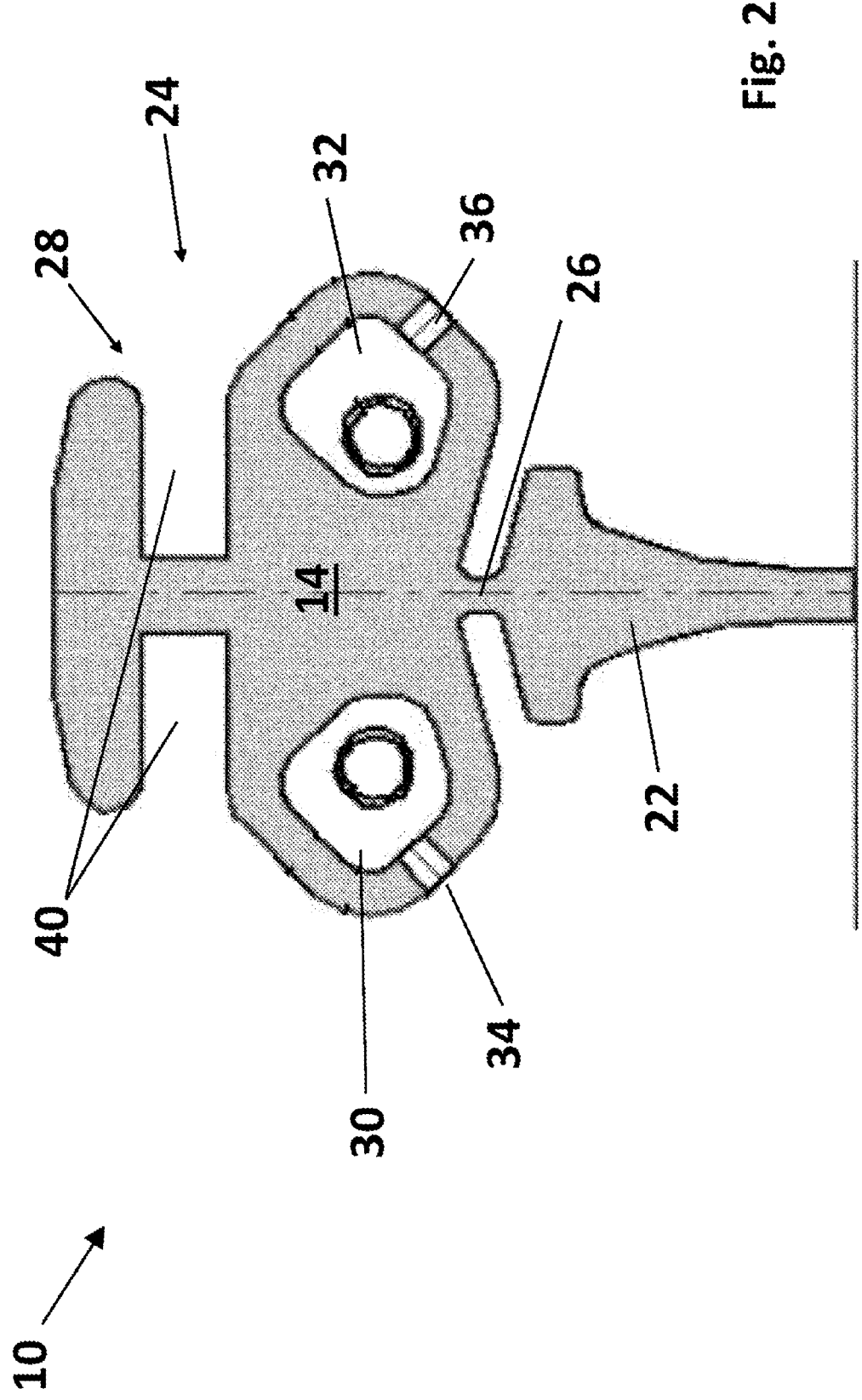
FIG. 2 shows a schematic illustration of a cross section through a wiper strip of a wiper blade according to the invention.

FIG. 2 schematically shows a cross section through the wiper strip 14 of the wiper blade 10 according to the invention. The wiper strip 14 comprises a wiper lip 22 and a fastening region 24. The wiper lip 22 is fastened to the fastening region 24 by way of a tilting web 26. The fastening region 24 has a fastening element 28 which is used to fasten the wiper strip 14 to the spring rail 12.

In fastening region 24, the wiper strip 14 has a first liquid channel 30 and a second liquid channel 32, through which cleaning liquid can be guided. In addition, the first liquid channel 30 has a first opening 34 through which cleaning liquid can be dispensed in the direction of the wiper lip 22. Equally, the second liquid channel 32 has a second opening 36 by means of which cleaning liquid can also be dispensed in the direction of the window or the wiper lip 22.

A heating device 38 is arranged within the first liquid channel 30 and the second liquid channel 32. The heating device 38 comprises a heating wire which is provided with a plastics sheath for insulation with respect to the cleaning liquid. In a variation, it is also possible for a ceramic sheath to be provided.

The fastening element 28 has two grooves 40, into which a respective part of a two-part spring rail 12 can be inserted. However, any other fastening to the spring rail 12 is also possible here. In this case, in addition to the form-fit connection shown, it is also possible for an adhesive connection or a force-fit connection to be provided.

FIG. 3 shows a schematic side view of the central region with the fastening means 18 of the wiper blade 10 according to the invention. The first openings 34 are arranged distributed along the longitudinal extent (double arrow L). In this case, the fastening means 18 engages over the fastening region 24 of the wiper strip 14. Above the tilting web 26 of the wiper strip 14, the first liquid channel 30 is arranged in the fastening region 24. The first liquid channel 30 branches off in the region of the fastening means 18, such that a liquid supply (not depicted here) from the wiper arm can be fed to the first liquid channel 30, with the result that cleaning liquid can flow into the first liquid channel 30. The heating device 38 runs within the first liquid channel 30, which partially runs within the fastening means 18.

In addition, the fastening means 18 has a fastening eye to which the wiper arm can be fastened. For this purpose, the fastening variants known from the prior art are suitable. In particular, the fastening eye 14 may be embodied as a bolt or as an opening, with which a bolt of the wiper arm or an opening of the wiper arm correspondingly engages.

In a variation of the invention, the first liquid channel 30 does not also have to run through the fastening means 18, but merely through the heating device 38. Liquid would then be applied to the first liquid channel 30 at another location. The fastening means 18 is formed from plastic, but may also be formed from metal in a variation. The first openings 34 or the second openings 36 may also be provided with nozzle elements, such that suitable spray characteristics are obtained.

FIG. 3 shows only the first liquid channel 30 in each case. In this side view, the second liquid channel 32 (FIG. 2) would be directly behind it, such that the description given with respect to the first liquid channel 30 correspondingly applies to this second liquid channel 32.

In a variation of the invention, it is also possible for only a single liquid channel 30, thus only a first liquid channel 30, to be provided and for a second liquid channel 32 to be dispensed with.

In a further variation of the invention, the first liquid channel 30 and/or the second liquid channel 32 may also be formed separately from the wiper strip 14. It is thus also possible for the first liquid channel 30 and/or the second liquid channel 32 to be arranged as separate channels on the spring rail 12. Furthermore, the first liquid channel 30 may also run exclusively in the fastening means 18, the first opening 34 or the second opening 36 also being provided only in the fastening means. The heating device 38 then likewise runs only in the fastening means 18.

The invention claimed is:

1. A wiper blade (10) comprising a wiper strip (14) extending along a longitudinal extent (L), a liquid channel (30) for guiding cleaning liquid along the longitudinal extent (L), and a heating device, characterized in that the heating device is arranged entirely within the liquid channel (30) and extends along the longitudinal extent (L), wherein a fastening means (18) for fastening to a wiper arm is provided, and the heating device and the liquid channel (30) are each guided entirely through the fastening means (18) along the longitudinal extent (L), wherein the wiper blade (10) further includes an electrical lead coupled to the heating device, wherein the electrical lead is guided through a portion of the fastening means (18) outside of the liquid channel, and is configured to supply energy to the heating device to cause the heating device to warm.

2. The wiper blade (10) as claimed in claim 1, characterized in that the heating device is in the form of a sheathed heating wire.

3. The wiper blade (10) as claimed in claim 1, characterized in that the heating device comprises a heating wire with a plastics sheath.

4. The wiper blade (10) as claimed in claim 1, characterized in that the liquid channel (30) has at least one opening (34) for dispensing cleaning liquid.

5. The wiper blade (10) as claimed in claim 4, characterized in that more openings (34) are provided which are arranged distributed over the longitudinal extent.

6. The wiper blade (10) as claimed in claim 1, characterized in that the liquid channel (30) is formed in one piece with the wiper strip (14).

7. The wiper blade (10) as claimed in claim 1, characterized in that the wiper strip (14) has a wiper lip (22) and is formed in one piece.

8. The wiper blade (10) as claimed in claim 1, characterized in that the liquid channel (30) in the fastening means (18) has openings (34) for dispensing cleaning liquid.

9. The wiper blade (10) as claimed in claim 1, wherein the wiper blade (10) is for a motor vehicle.

10. The wiper blade (10) according to claim 1, wherein an entirety of the heating device is configured to be heated during operation of the heating device.

\* \* \* \* \*